Nov. 21, 1967     W. J. HALL     3,353,443
SLIDE PROJECTOR IN COMBINATION WITH A SOUND
TAPE AND TRANSPARENCY SLIDE HOLDER
Original Filed Feb. 8, 1962     6 Sheets-Sheet 6

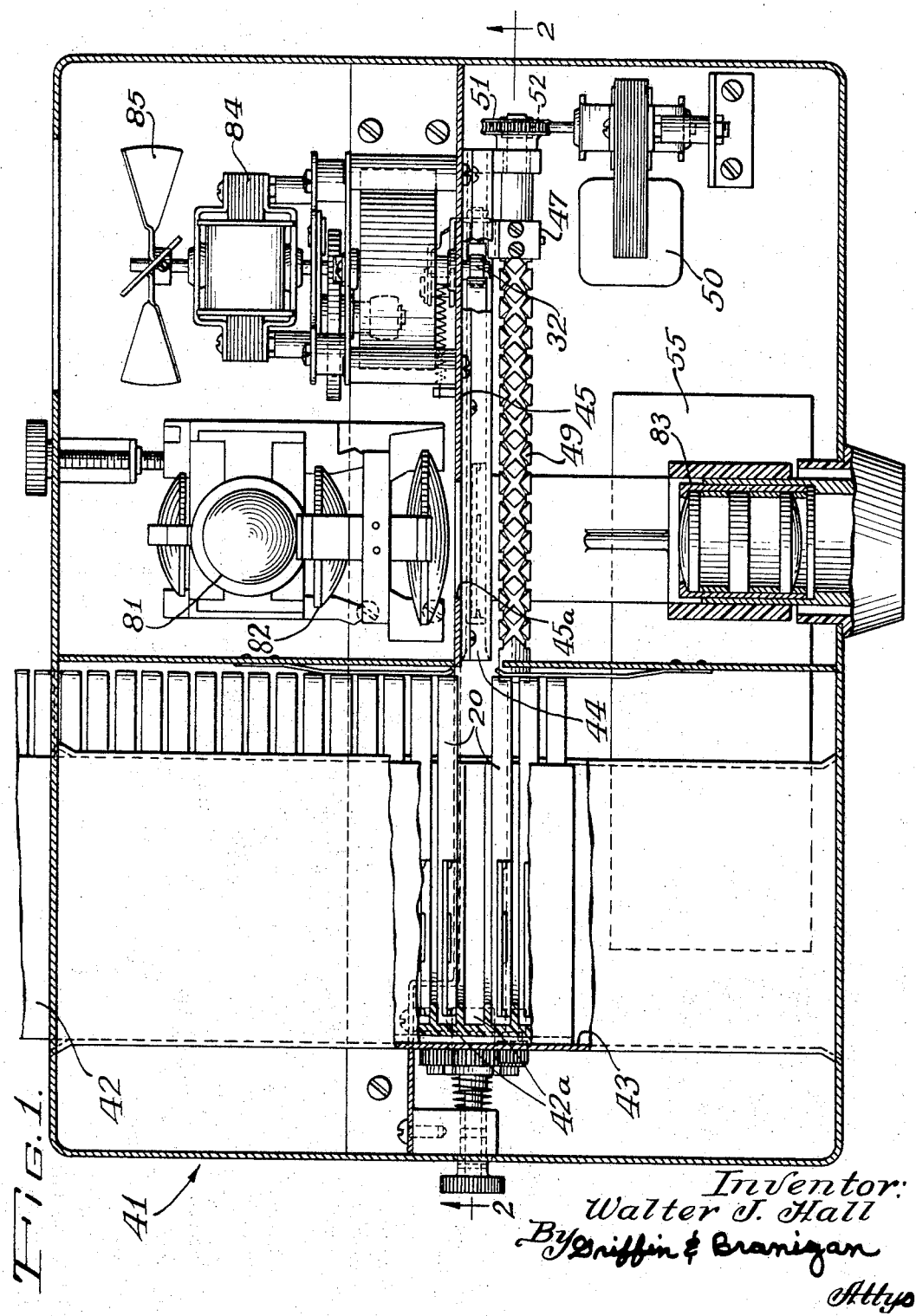

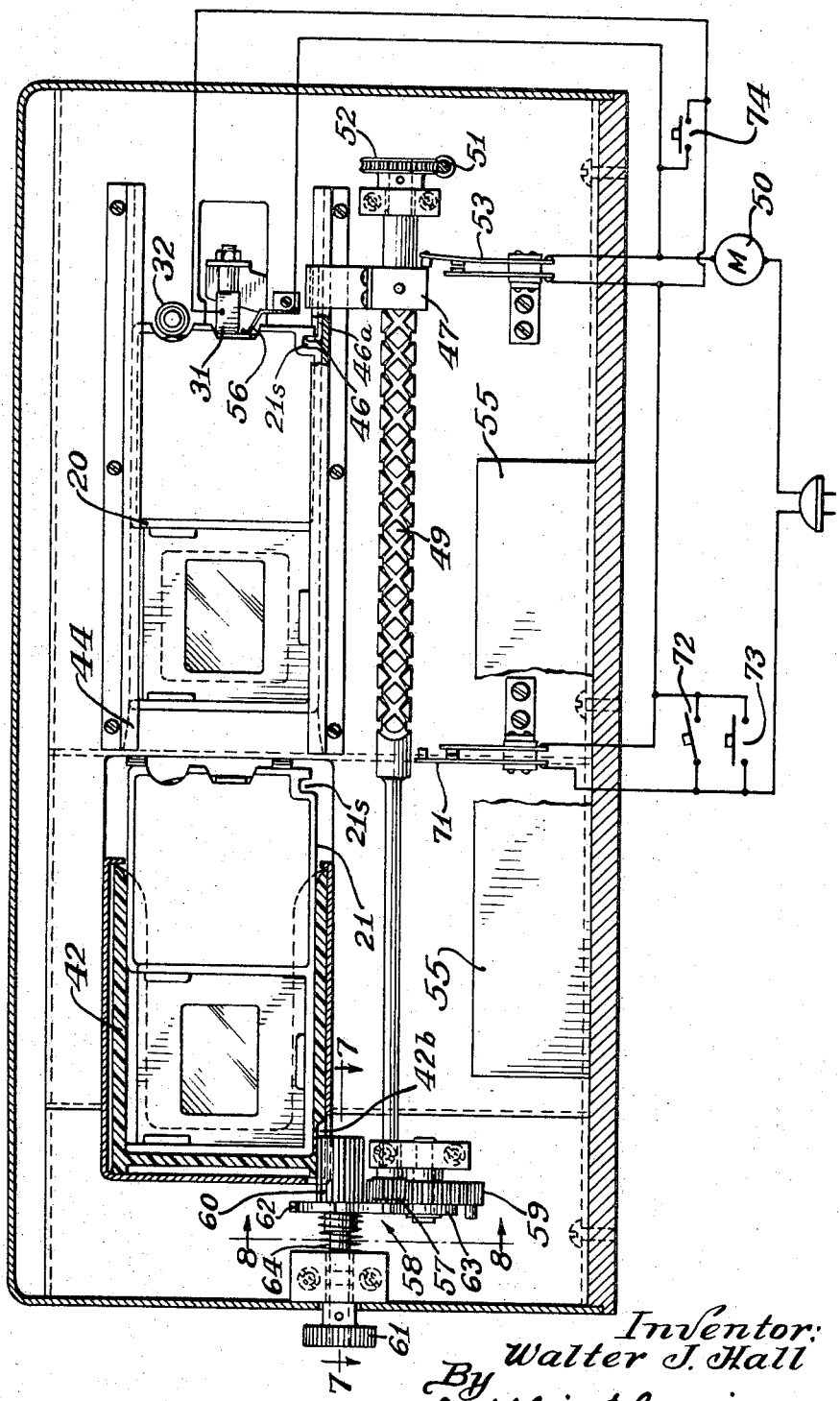

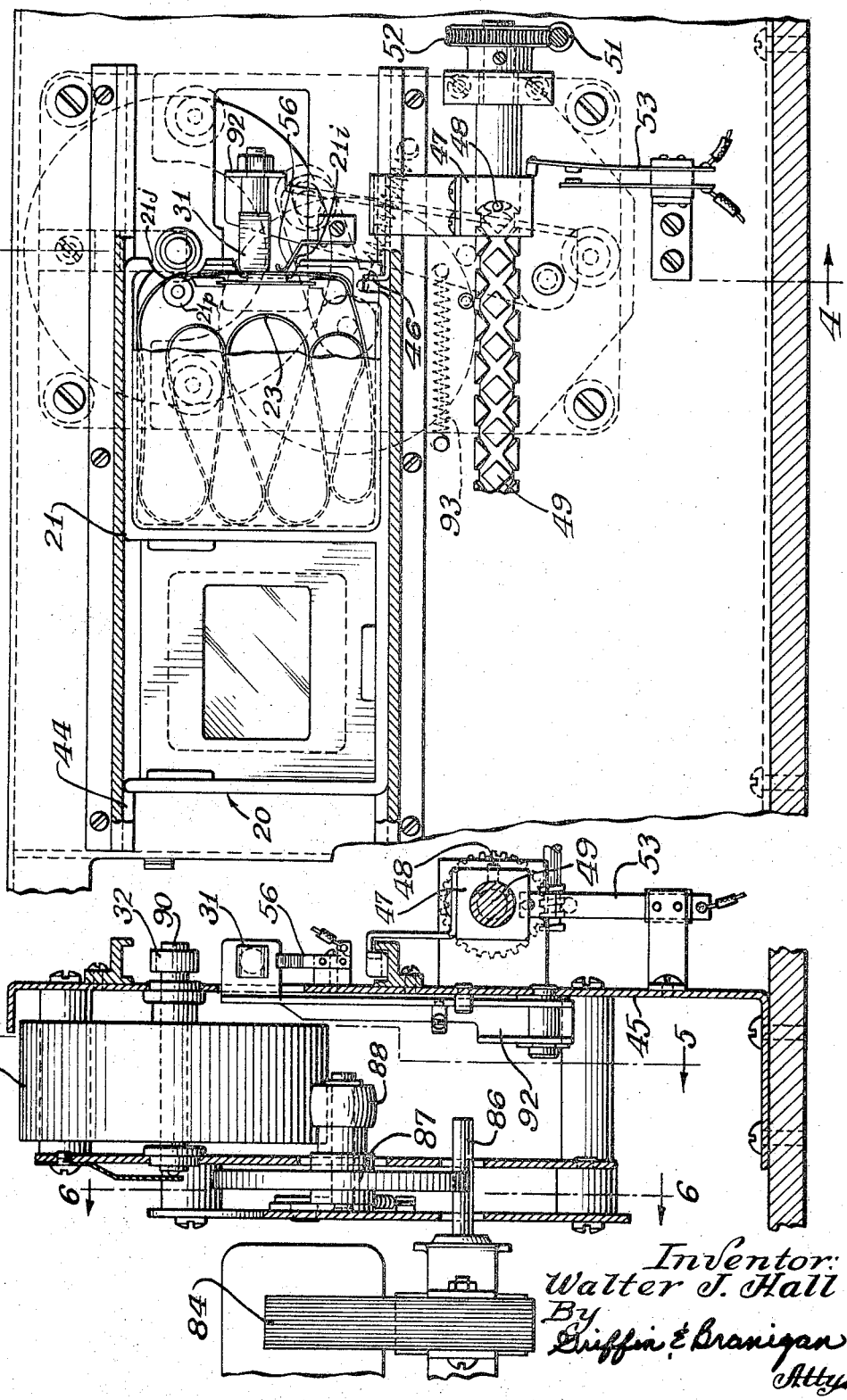

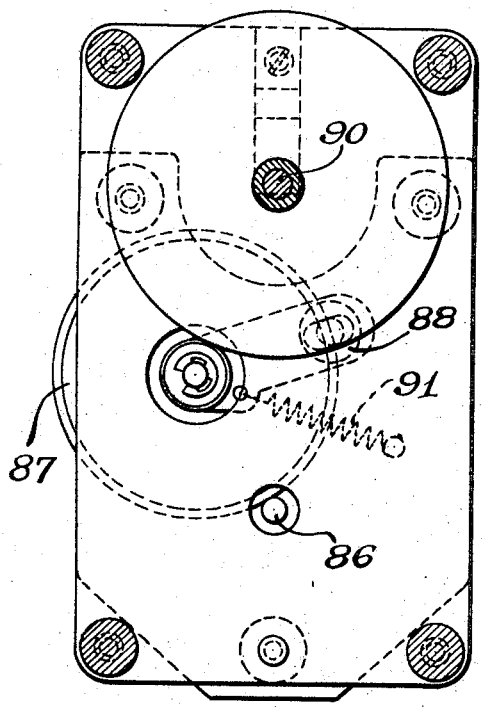
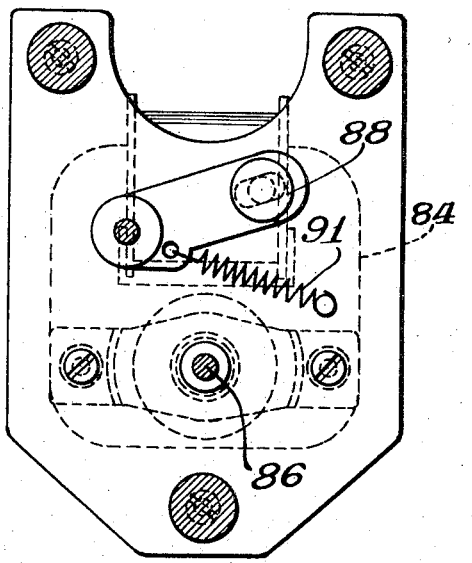
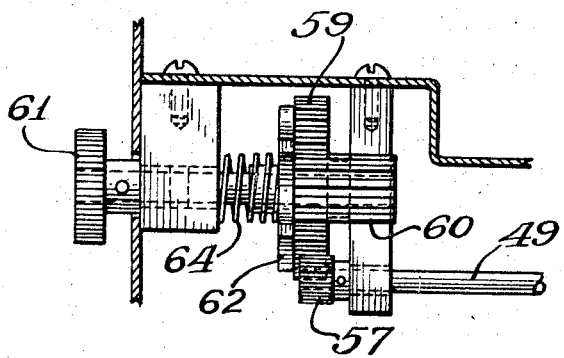
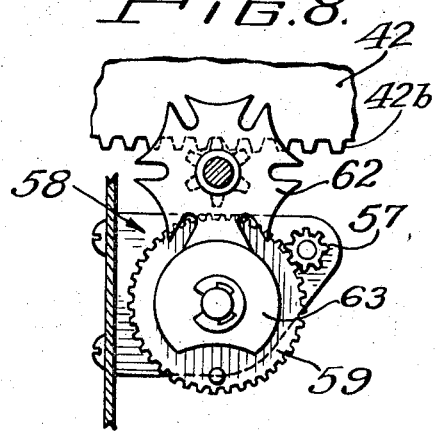
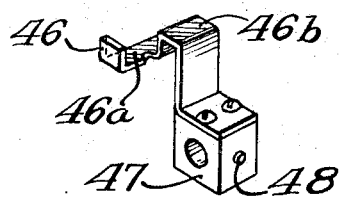

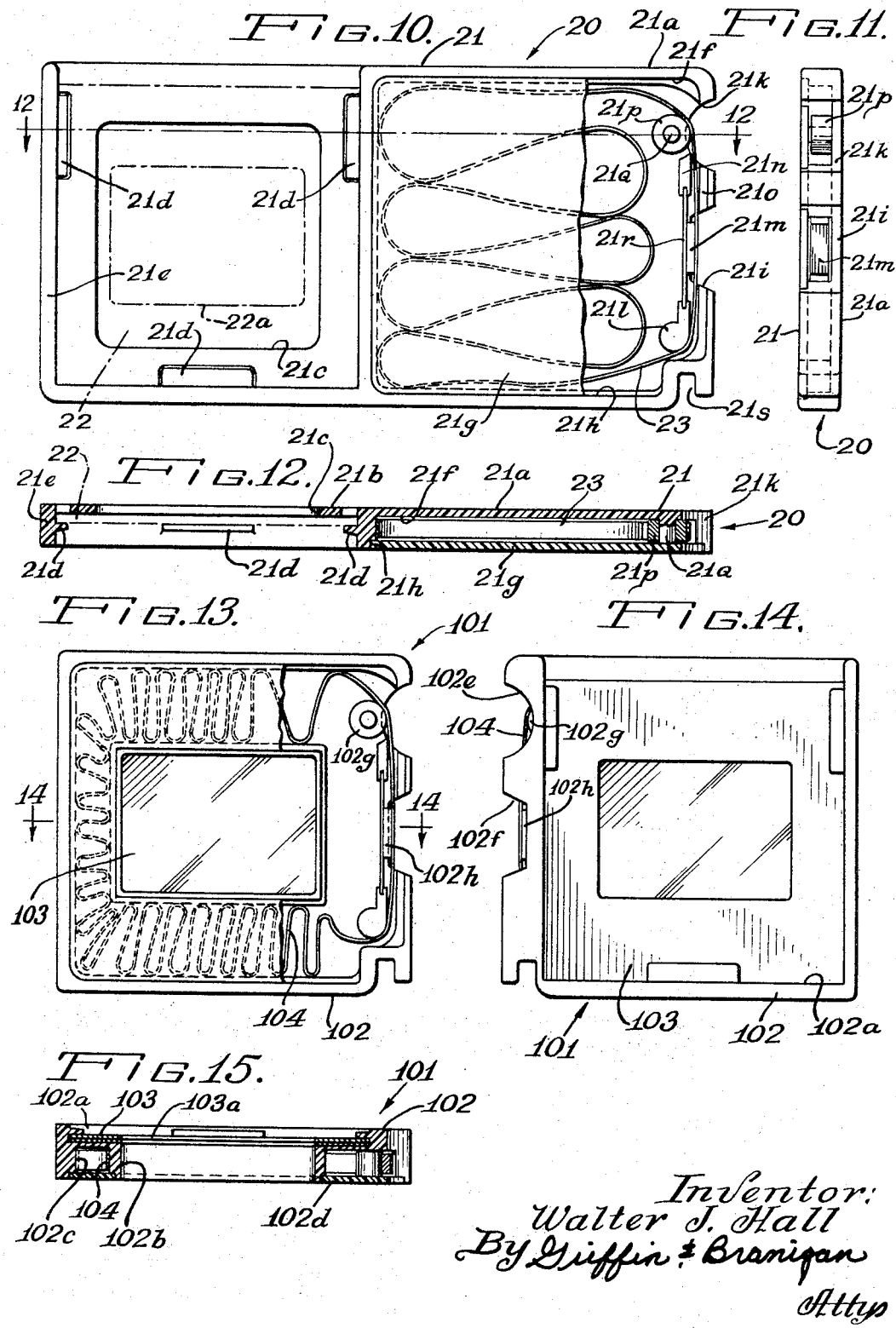

Inventor
Walter J. Hall
By Griffin & Branigan
Attys

United States Patent Office 3,353,443
Patented Nov. 21, 1967

3,353,443
SLIDE PROJECTOR IN COMBINATION WITH A SOUND TAPE AND TRANSPARENCY SLIDE HOLDER
Walter J. Hall, Chicago, Ill., assignor to Bell & Howell Company, Chicago, Ill., a corporation of Illinois
Original application Feb. 8, 1962, Ser. No. 171,915, now Patent No. 3,256,775, dated June 21, 1966. Divided and this application June 3, 1966, Ser. No. 571,161
4 Claims. (Cl. 88—28)

ABSTRACT OF THE DISCLOSURE

There is herein disclosed a sound slide holder having side-by-side portions for holding an endless sound tape and a transparency. The holder also includes a guide means having a pressure plate for backing up the endless sound tape and holding it against a sound head and a drive capstan. The holder is adapted to be mounted in a slide projection apparatus having a slide changing means for selectively moving the holder along a guideway from a retracted position to a projection position. When in the projection position the pressure plate urges the endless sound tape into engagement with the drive capstan so that the tape is moved past a sound head. The slide changing means includes a nut and bracket assembly wherein the bracket is adapted to selectively engage the slide holder. The nut has a pin thereon engaging a selectively reversible double threaded endless worm. A means is provided for selectively reversing the worm's direction so that the nut and bracket assembly and thereby the holder are selectively moved between the projection and retraction positions.

---

This is a division of application Ser. No. 171,915 which was filed on February 8, 1962, and issued on June 21, 1966, as Patent No. 3,256,775.

This invention relates to slide projection, and more particularly to slide projection with accompanying sound.

An object of the invention is to provide a slide holder having a portion holding a photographic transparency and another portion holding a sound tape.

Another object of the invention is to provide a slide holder having a portion for holding a photographic slide together with a chamber in which an endless magnetic tape is mounted.

A further object of the invention is to provide a slide projector having a sound head and a projection aperture together with a holder positioning a sound tape and a slide in operative positions with the sound head and projection aperture.

A complete understanding of the invention may be obtained from the following detailed description of slide projection apparatus forming specific embodiments thereof, when read in conjunction with the appended drawings, in which:

FIGURE 1 is a horizontal sectional view of slide projector apparatus forming one embodiment of the invention;

FIGURE 2 is a vertical sectional view taken along line 2—2 of FIGURE 1;

FIGURE 3 is an enlarged vertical sectional view of a portion of the apparatus shown in FIGURE 2;

FIGURE 4 is an enlarged vertical sectional view taken along line 4—4 of FIGURE 3;

Figure 16:
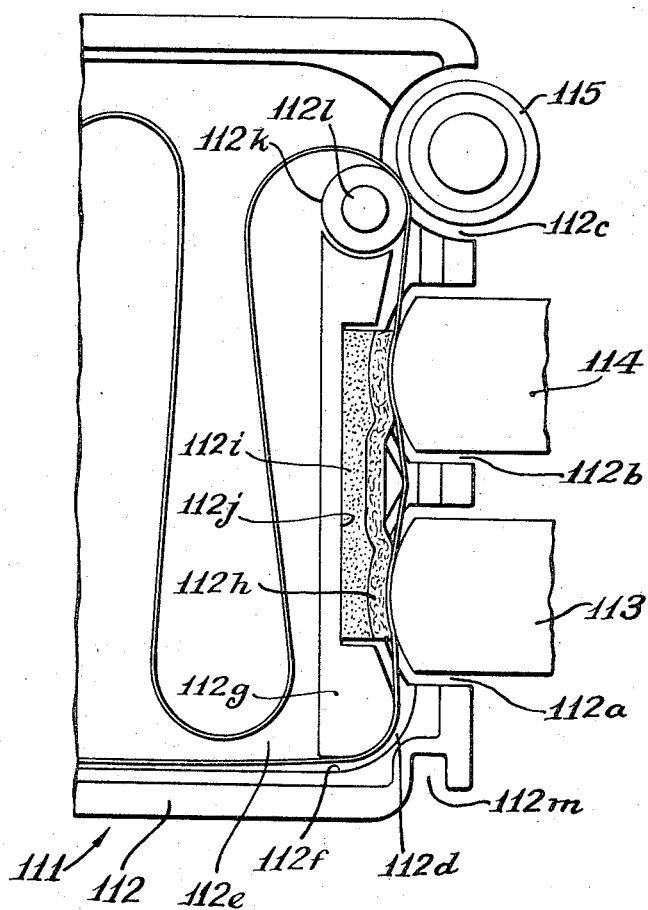

FIGURES 5 and 6 are enlarged vertical sectional views taken along lines 5—5 and 6—6, respectively, of FIGURE 4;

FIGURE 7 is an enlarged horizontal sectional view taken along line 7—7 of FIGURE 2;

FIGURE 8 is an enlarged vertical sectional view taken along line 8—8 of FIGURE 2;

FIGURE 9 is an enlarged perspective view of a portion of the apparatus shown in FIGURE 1;

FIGURE 10 is a front elevational view of a slide holder forming a portion of the apparatus of FIGURE 1;

FIGURE 11 is an end view of the slide holder of FIGURE 10;

FIGURE 12 is a horizontal sectional view taken along line 12—12 of FIGURE 10;

FIGURES 13, 14 and 15 are views of a sound slide holder forming a modification of the invention; and FIGURE 16 is an enlarged fragmentary front elevational view of a sound slide forming a modification of the invention.

The invention provides sound slide projection apparatus including a sound slide holder having a portion for holding a sound tape and a portion holding a mounted slide. The holder may be moved to an operative position in a slide projector, in which position the transparency of the mounted slide is aligned with the aperture of the slide projector and the sound tape is in engagement with a sound head and means for advancing the sound tape of the projector. Preferably the sound tape is endless and enclosed within a storage chamber in the slide holder except for the portion engaging the feeding means and the sound head. It is also desirable to have a plurality of the sound slide holders with a tray for carrying the slide holders with the projector provided with means for automatically moving each slide holder from the tray to its operative position and back into the tray.

Referring now in detail to the drawings, there is shown in FIGURES 10, 11 and 12 a sound slide 20 including a holder 21 having an audio portion 21a and a visual portion 21b. The slide also includes a mounted transparency or slide 22 and a sound tape 23. The visual portion 21b has an aperture 21c larger than transparency 22a, and also has retaining tabs 21d projecting from frame portion 21e thereof. Certain features of the slide holder 21 are disclosed and claimed in co-pending application Ser. No. 786,199, now Patent No. 3,044,198 which issued on July 17, 1962 and was filed January 12, 1959, by Frank C. Badalich and assigned to the common assignee.

The audio portion 21a of the holder 21 has a cup-shaped recess or chamber 21f for holding the sound tape 23, which, in the embodiment shown, is a magnetic tape and is endless, the tape being of a width slightly less than the portion of depth of the chamber from the bottom of the chamber to a cover plate 21g which fits into recess 21h and is retained by cement or detenting. The tape, of course, may be of the optical type and may be mounted on supply and takeup spindles if so desired. The holder has an edge notch or recess 21i for receiving a known magnetic sound head 31 (FIGURE 3) and an edge notch or recess 21k for receiving capstan 32. The tape travels around guide pin 21l (FIGURES 10 and 11), over pressure pad 21m, between guide member 21n molded integrally with the body portion of the holder and wall 21o and around backing roller 21p rotatable on pin 21q. The pad 21m is mounted on leaf spring 21r seated in slots in members 21l and 21o. The pad 21m may be formed of polytetrafluoroethylene or may be of felt. If desired, the roller 21p, instead of being rotatable as shown, may be fixed against rotation. A recess or notch 21s is provided for pushing and pulling the slide holder.

A projector 41 (FIGURES 1–9) forming one embodiment of the invention is designed to index a tray 42, which carries the slide 20, along a guideway 43 sequentially to a slide changing position in which a selected one of the slides 20 is aligned with a changer guideway 44. The tray has septums 42a for receiving and holding the slides 20. The guideway 44 extends past a projection aperture 45a in a wall 45 to the capstan 32 and sound head 31, and a hook 46 slidable in the bottom channel of the guideway 44 is adapted to pull the aligned slide out of the tray to the projection and playing position and return the slide into the tray. The hook 46 has a guide portion 46a slidable in the lower guide channel, a looped clearance portion 46b (FIGURE 9) and a bracket portion 46c fixed rigidly to a nut 47 having a thread pin 48 meshing with a double-threaded reversible feed screw or endless worm 49 driven by electric motor 50, through worm 51 and worm gear 52. Whenever one of the slides 20 is brought to the projection and playing position, the nut 47 opens limit switch 53 to stop the motor.

When the slide 20 is in its projection and playing position, the tape 23 is pressed or pinched between the capstan 32 (FIGURE 3) and backing roller 21p and the capstan pulls the tape past the known sound head 31, which reads the tape and transmits the signals to a known amplifier and loud speaker system 55 to play the sound recorded on the sound tape 23, the spring urged pad 21m holding the tape against the sound head. A leaf spring contactor 56 contacts the tape and serves when a conductive tab (not shown) positioned in a predetermined location at the end of the recording thereon on the tape budges the contactor 56 and the shell of the head 31 to close a circuit to the motor, this circuit being in parallel with the switch 53. This starts the motor 53 to drive the nut 47 back to the left, as viewed in FIGURES 2 and 3, to return the slide to the tray. The screw 49 turns a gear 57 to drive a Geneva gear mechanism through gear 59 to index the tray 42 to present the next slide at the time the hook 46 is laterally aligned with the notches 21s in the slides in the tray, the Geneva gear mechanism serving to drive indexing gear 60 (FIGURE 2) meshing with rack 42b of the tray 42. For manual indexing, manual knob 61 is pulled to the left to pull Geneva gear 62 against spring 64 out of mesh with member 63 of the Geneva gear mechanism and the knob 61 is turned manually to index the tray 42 to the desired position and the spring 64 returns the gear 62 into mesh.

A normally closed limit switch 71 (FIGURE 2) in series with the switch 53 serves to stop the motor when the nut 47 reaches its extreme lefthand position unless a manually operable switch 72 is set in its automatic or closed position or a manually operable momentary switch 73 is held closed. Similarly, a manually operable momentary switch 74 is provided in parallel with the switch 53 and the shell of the head 31 and contactor 56 to start a slide change at the user's will.

A known light source 81 (FIGURE 1), condenser lens system 82 and projection lens 83 are provided for projecting the transparency. A motor 84 drives a cooling fan 85 and also drives the capstan 32 through shaft 86 (FIGURES 4, 5 and 6), disc 87 driving disc 88, disc 88 and flywheel 89 rigidly connected to shaft 90 to which the capstan 32 is keyed. The disc 87 is urged into frictional engagement with the shaft 86 by spring 91. The head 31 is mounted on pivotal arm 92 (FIGURES 3 and 4) and is urged to the left, as viewed in FIGURE 3, by spring 93.

In FIGURES 13, 14 and 15 there is shown a sound slide 101 which forms the subject matter of co-pending application Ser. No. 172,014, which issued as United States Patent 3,176,580 on April 6, 1965, and was filed Feb. 8, 1962 by Jack L. Metz and assigned to the common assignee. The sound slide 101 includes a slide holder 102 holding a mounted transparency 103 and an endless sound tape 104 in concentric relationship. At its back side the slide holder 102 has a cup-shaped recess 102a with tabs 102b for retaining the mounted slide in the recess 102a with the transparency 103a aligned with rectangular aperture 102b. An annular, forwardly facing recess 102c serves with an annular cover plate 102d to form an annular storage chamber for the endless sound tape 104. At the forward edge of the holder 102 notches 102e and 102f are provided for clearance for a capstan (not shown) and sound head corresponding to the capstan 32 and sound head 31 disclosed above. Backing roller 102g and spring biased pressure plate 102h also are provided.

A sound slide 111 (FIGURE 16) includes a holder 112 like the holder 21 but including a third notch 112a for a known erase head 113 as well as notches 112b and 112c for a known play head 114 and an advancing capstan or pinch roller 115. A guide passage 112d for a sound tape in chamber 112e is formed between outer wall 112f and boss or plate 112g integral with the back wall of the holder. A felt backing member 112h is supported by and cemented to sponge rubber member 112i cemented to recessed surface 112j. A polytetrafluoroethylene backing roller 112k is mounted on pin 112l integral with the back wall of the holder. A pushing and pulling notch 112m also is provided.

While the invention is thus described, it is not wished to be limited to the precise details described, as changes may be readily made without departing from the spirit of the invention.

What is claimed is:

1. In a slide projection apparatus, a sound head, a driven capstan, means driving the capstan, light projecting means having a light path spaced from the capstan, an endless sound tape, a transparency, a sound slide holder holding the transparency and the endless sound tape, and a slide-changer for moving the holder from a retracted position to a projection position in which the transparency intersects the light path and the tape engages the sound head and capstan, the slide holder including guide means having a pressure plate for backing up the endless sound tape and holding the tape in engagement with the sound head and the capstan.

2. In a slide projection apparatus, a sound slide holder, changer means for moving the slide holder between a retracted position and a projection position, drive means for driving the changer means, first control means operative when the holder arrives at the projection position for stopping the drive means, an endless sound tape carried by the holder, a sound head, said holder including a pressure plate for backing up the endless sound tape against said sound head, means including said sound head for playing the tape when the holder is in its projection position, means for advancing the tape past the sound head, and means operable after a predetermined length of tape has been advanced past the head to actuate the drive means to move the holder to its retracted position.

3. In a slide projection apparatus, means defining a projection aperture, a guideway extending from one side of the aperture to the other side thereof, a transparency, an endless sound tape, a sound slide holder having means holding a transparency and also having a compartment for holding the tape, a sound head positioned at one end of the guideway, a capstan positioned at said end of the guideway, the holder having an opening to the compartment facing the sound head and the capstan and also having backing means for holding the tape against the sound head and the capstan, and means for moving the slide holder along the guideway from a retracted position to a projection positon in which the transparency is at the projection aperture and the tape is held in engagement with the sound head and the capstan.

4. In a slide projection apparatus, a transparency, an endless sound tape, a sound slide holder having a compartment for holding the tape therein in pleated position and also having an opening to the compartment in an edge of the holder, the holder also having guide means for guiding the tape across the opening, sound translating means adapted to enter the opening to engage the tape, a drive capstan, said guide means including a pressure plate for backing up said endless sound tape and urging said endless sound tape into engagement with said sound translating means and said capstan so that when thusly engaged said capstan is adapted to drive said endless sound tape past said sound translating means, and means for effecting relative movement between the holder and the sound translating means and capstan to cause engagement of said endless sound tape between said pressure plate and said capstan.

References Cited

UNITED STATES PATENTS

| | | | |
|---|---|---|---|
| 3,057,225 | 10/1962 | Bregman | 88—28 |
| 3,123,925 | 3/1964 | Johnson | 40—79 |
| 3,177,768 | 4/1965 | Hallamore | 88—28 |

FOREIGN PATENTS

| | | |
|---|---|---|
| 1,096,065 | 12/1960 | Germany. |
| 349,815 | 12/1960 | Switzerland. |

NORTON ANSHER, *Primary Examiner.*

R. M. SHEER, *Assistant Examiner.*